United States Patent [19]

Lung

[11] Patent Number: 5,476,620
[45] Date of Patent: Dec. 19, 1995

[54] METHOD FOR PRODUCING A POLYVINYL ALCOHOL SOLE

[75] Inventor: Chi-Huang Lung, Ping-Chen, Taiwan

[73] Assignee: Chin-San Hsieh, Kaohsiung, Taiwan

[21] Appl. No.: 370,110

[22] Filed: Jan. 9, 1995

Related U.S. Application Data

[63] Continuation-in-part of Ser. No. 123,885, Sep. 17, 1993, abandoned.

[51] Int. Cl.⁶ .................................................. B29C 44/02
[52] U.S. Cl. .................................................. 264/51; 264/54
[58] Field of Search ................................. 264/51, 53, 54

[56] References Cited

U.S. PATENT DOCUMENTS

| | | | |
|---|---|---|---|
| 4,231,169 | 11/1980 | Toyama et al. | 36/43 |
| 4,241,124 | 12/1980 | Kremer et al. | 428/156 |
| 4,418,483 | 12/1983 | Fujita et al. | 264/45.1 |
| 4,999,072 | 3/1991 | Dischler | 156/145 |
| 5,036,603 | 8/1991 | Dischler | 36/44 |
| 5,308,420 | 5/1994 | Yang | 264/45.1 |
| 5,318,645 | 6/1994 | Yang | 264/45.1 |
| 5,350,544 | 9/1994 | Bambara et al. | 264/321 |

*Primary Examiner*—Allan R. Kuhns
*Attorney, Agent, or Firm*—Darby & Darby

[57] ABSTRACT

A method of producing a polyvinyl alcohol sole and the product are disclosed. The method includes the steps of mixing starch and water in order to form a cool paste starch; mixing polyvinyl alcohol and water to form a polyvinyl alcohol solution; mixing the cool paste starch and an acid to form a first solution; mixing the first solution, the polyvinyl alcohol solution, activated carbon and a foaming agent in order to form a second solution; mixing a catalyst and the second solution to form a third solution; pouring the third solution into a sole-forming mold and heating the forming mold in order to form a polyvinyl alcohol sole, cooling tie sole-forming mold and removing the polyvinyl alcohol sole from the sole-forming mold; dehydrating the polyvinyl alcohol sole; neutralizing the polyvinyl alcohol sole; dipping the polyvinyl alcohol sole in water; and dehydrating and drying the polyvinyl alcohol sole.

3 Claims, No Drawings

METHOD FOR PRODUCING A POLYVINYL ALCOHOL SOLE

CROSS-REFERENCE OF RELATED APPLICATION

This invention is a continuation-in-part (CIP) application of U.S. Ser. No. 08/123,885, filed on Sep. 17, 1993, and is now abandoned.

BACKGROUND OF THE INVENTION

1. Field of the Invention

This invention relates to a method for producing a polyvinyl alcohol sole and the product thereof, more particularly to a method for producing a polyvinyl alcohol sole which can reduce bad smell levels and absorb sweat or moisture, and is air-permeable.

2. Description of the Related Art

Conventionally, shoe soles are provided in shoes in order to absorb the shock when a wearer is walking and to make the wearer more comfortable. However, since tie soles are usually made of leather, soft plastics or ethylene-vinyl acetate fabrics, the soles cannot absorb the bad smell and the sweat or moisture in the shoes. In addition, such a sole is often air-impermeable. Therefore, the wearer may feel uncomfortable after wearing the shoes for a period of time.

SUMMARY OF THE INVENTION

It is therefore a main object of this invention to provide a sole which is air-permeable and is capable of absorbing bad smells and sweat or moisture and to provide a method for producing the same.

Accordingly, the method of producing a sole of this invention comprises the steps of:

(1) mixing starch and water at a weight ratio of 1:6 to form a starch solution, heating and stirring the starch solution to about 90° C. in order to form a hot paste starch, and cooling the hot paste starch to about 40 ° C. in order to form a cool paste starch;

(2) mixing, heating and stirring polyvinyl alcohol and water at a weight ratio of 1:6 at a temperature of about 120° C. until polyvinyl alcohol is completely dissolved in water in order to form a polyvinyl alcohol solution; and then cooling the polyvinyl alcohol solution to about 40° C.;

(3) mixing the cool paste starch and an acid to form a first solution;

(4) mixing the first solution; the polyvinyl alcohol solution, a predetermined amount of activated carbon and a foaming agent in order to form a second solution;

(5) mixing a catalyst and the second solution to form a third solution, which contains 3.2–4.7 wt % of the catalyst, 3.7–6.8 wt % of the acid, 28–47 wt % of the cool paste starch and 47–65 wt % of polyvinyl alcohol solution, based on the total weight of the catalyst, the acid, the cool paste starch and the polyvinyl alcohol solution, and in which the weight of the activated carbon is 0.3–0.5% of the total weight of the catalyst, the acid, the cool paste starch and the polyvinyl alcohol solution, and in which the weight of the foaming agent is 0.003% of the total weight of the catalyst, the acid, the cool paste starch and the polyvinyl alcohol solution;

(6) pouring the third solution into a sole-forming mold and heating the sole-forming mold in order to form a polyvinyl alcohol sole, cooling the sole-forming mold and removing the polyvinyl alcohol sole from the sole-forming mold;

(7) dehydrating the polyvinyl alcohol sole;

(8) neutralizing the polyvinyl alcohol sole;

(9) dipping the polyvinyl alcohol sole in water; and

(10) dehydrating and drying the polyvinyl alcohol sole.

Other features and advantages of this invention will become apparent in the following detailed description of the preferred embodiments of this invention.

DETAILED DESCRIPTION OF THE PREFERRED EMBODIMENTS

Starch and water at a weight ratio of 1:6 are mixed to form a starch solution. The starch solution is then heated to about 90° C. and stirred in order to form a hot paste starch. The hot paste starch is cooled to about 40° C. and forms a cool paste starch. The sum of the weight of the starch and water is no less than 150 grams.

Polyvinyl alcohol, which has a trade-name "BF-17" and is produced by Chang Chun Chemical Co. LTD., and water are mixed at a weight ratio of 1:6 and heated to a temperature of about 120° C. and stirred until the polyvinyl alcohol is completely dissolved in the water in order to form a polyvinyl alcohol solution. The polyvinyl alcohol solution is then cooled to about 40° C. The sum of the weight of the polyvinyl alcohol and water is 350 grams.

20 grams of an acid, in this embodiment, 32% hydrochloric acid is added to the cool paste starch. The hydrochloric acid and the cool paste starch are mixed and stirred sufficiently in order to form a first solution. The hydrochloric acid's function is to enhance the foaming effect of the first solution.

The first solution, the polyvinyl alcohol solution, a predetermined amount of activated carbon and a foaming agent are mixed and stirred in order to form a second solution. In this embodiment, the foaming agent is P.N.S. (p-toluene sulfonate and alkyl sulfonate).

A catalyst and the second solution are then mixed to form a third solution. In this embodiment, the catalyst is 37% formalin and its weight is no less than 17 grams. Preferably, the third solution contains 3.2–4.7 wt % of the catalyst, 3.7–6.8 wt % of hydrochloric acid, 28–47 wt % of the cool paste starch and 47–65 wt % of polyvinyl alcohol solution, based on the total weight of the catalyst, the acid, the cool paste starch and the polyvinyl alcohol solution. The weight of the activated carbon may be 0.3–0.5% of the total weight of the catalyst, the hydrochloric acid, the cool paste starch and the polyvinyl alcohol solution. The weight of the foaming agent is 0.003% of the total weight of the catalyst, the hydrochloric acid, the cool paste starch and the polyvinyl alcohol solution.

The third solution is poured into a sole-forming mold. The sole-forming mold is thereafter heated to 85° C. in order to form a polyvinyl alcohol sole. The sole-forming mold is cooled to room temperature in order to facilitate removal of the polyvinyl alcohol sole from the mold.

The obtained polyvinyl alcohol sole is acidic and is dehydrated in order to remove water therein. Next, the polyvinyl alcohol sole is neutralized by means of soda water in order to remove the inorganic acid left in the obtained polyvinyl alcohol sole. To ensure the residual inorganic acid in the polyvinyl alcohol sole which has been treated by the neutralization process can be completely removed, said polyvinyl alcohol sole is dipped in water. The polyvinyl alcohol sole is then dehydrated and dried. Finally, the polyvinyl alcohol sole is finished by means of embossing and cutting processes.

It is found that the polyvinyl alcohol sole of this invention can absorb bad smells in the shoe because of the addition of the activated carbon and has a good air-permeable ability because of the addition of the foaming agent, thereby enhancing the heat-dissipation effects. In another other preferred embodiment, the method of producing a polyvinyl alcohol sole of this invention further includes the steps of adding a synthetic fiber into the second solution. The weight of the synthetic fiber is 3–4% of the total weight of the catalyst, the acid, the coal paste starch and the polyvinyl alcohol solution. The rest of the steps of producing the polyvinyl alcohol sole is the same as those of the aforementioned embodiment. The polyvinyl alcohol sole has excellent anti-stretch properties and flexibility because of the addition of the synthetic fiber.

Table 1 is a test report of the polyvinyl alcohol sole obtained from the TAIWAN FOOTWEAR RESEARCH INSTITUTE.

TABLE 1

| Test items | Result | Condition & Method |
| --- | --- | --- |
| Break test | 25 kg/cm$^2$ | CNS3479, 1353, 5613 |
| Stretch test | 52.6 kg/cm$^2$ | CNS3479, 3553, 300 mm/min |
| TABER wear test | wearing index = 0.03 (500 g, 1000 times) | CNS3309, 6483, 6540 |
| Water absorption | 276.8% | CNS7819, K6688 |

From Table 1, it can be seen that the polyvinyl alcohol sole of this invention has an excellent anti-stretching ability and good water absorption ability. Therefore, the polyvinyl alcohol sole is more durable and is capable of absorbing sweat or moisture from the shoe.

With this invention thus explained, it is apparent that numerous modifications and variations can be made without departing from the scope and spirit of this invention. It is therefore intended that this invention be limited only as indicated in the appended claims.

I claim:

1. A method for producing a polyvinyl alcohol sole, comprising the steps of:

(1) mixing starch and water at a weight ratio of 1:6 to form a starch solution, heating and stirring said starch solution to about 90° C. in order to form a hot paste starch, and cooling said hot paste starch to about 40° C. in order to form a cool paste starch;

(2) mixing, heating and stirring polyvinyl alcohol and water at a weight ratio of 1:6 at a temperature of about 120° C. until polyvinyl alcohol is completely dissolved in water in order to form a polyvinyl alcohol solution; and then cooling said polyvinyl alcohol solution to about 40° C.;

(3) mixing said cool paste starch and an acid to form a first solution;

(4) mixing said first solution, said polyvinyl alcohol solution, a predetermined amount of activated carbon and a foaming agent in order to form a second solution;

(5) mixing a catalyst and said second solution to form a third solution, which contains 3.2–4.7 wt % of said catalyst, 3.7–6.8 wt % of said acid, 28–47 wt % of said cool paste starch and 47–65 wt % of polyvinyl alcohol solution, based on the total weight of said catalyst, said acid, said cool paste starch and said polyvinyl alcohol solution, and in which the weight of said activated carbon is 0.3–0.5% of the total weight of said catalyst, said acid, said cool paste starch and said polyvinyl alcohol solution, and in which the weight of said foaming agent is 0.003% of the total weight of said catalyst, said acid, said cool paste starch and said polyvinyl alcohol solution;

(6) pouring said third solution into a sole-forming mold and heating said sole-forming mold in order to activate said foaming agent to form said polyvinyl alcohol sole as a porous sole, cooling said sole-forming mold and removing said polyvinyl alcohol sole from said sole-forming mold;

(7) dehydrating said polyvinyl alcohol sole;

(8) neutralizing said polyvinyl alcohol sole;

(9) dipping said polyvinyl alcohol sole in water; and

(10) dehydrating and drying said polyvinyl alcohol sole.

2. A method for producing a polyvinyl alcohol sole as claimed in claim 1 further comprising the steps of adding a synthetic fiber into said second solution, in which the weight of said synthetic fiber is 3–4% of the total weight of said catalyst, said acid, said cool paste starch and said polyvinyl alcohol solution.

3. A method for producing a polyvinyl alcohol sole as claimed in claim 1, wherein said polyvinyl alcohol sole is neutralized by means of soda water.

* * * * *